March 16, 1943.                R. EKSERGIAN ET AL                2,313,740
                                TRUCK CONSTRUCTION
                              Filed Jan. 6, 1940          6 Sheets-Sheet 1

Fig. 1.

INVENTORS
Rupen Eksergian,
Reuben H. Horton,
John W. Morton and
Nils K. Skivesen
BY
            ATTORNEY.

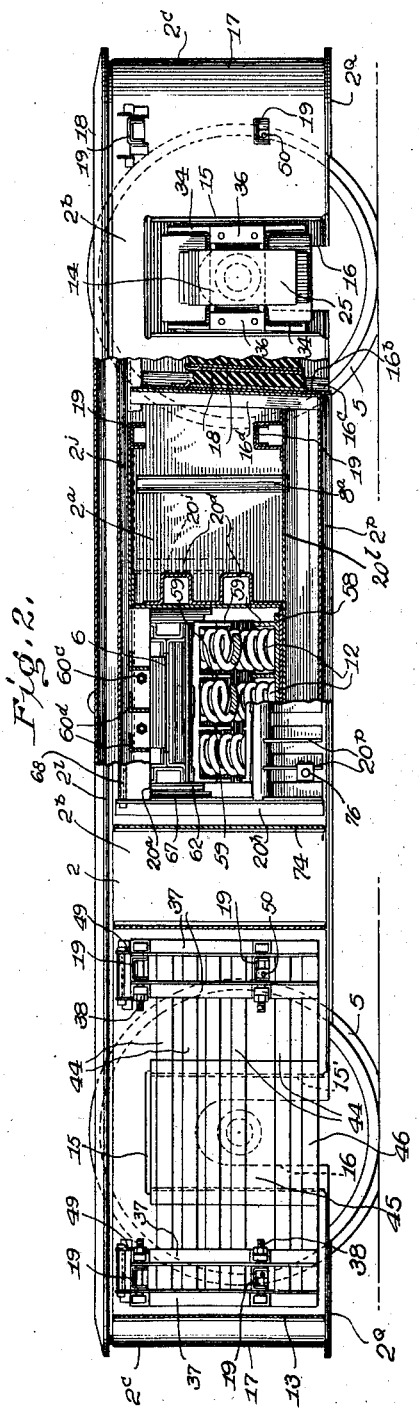

March 16, 1943.　　R. EKSERGIAN ET AL　　2,313,740
TRUCK CONSTRUCTION
Filed Jan. 6, 1940　　6 Sheets-Sheet 3
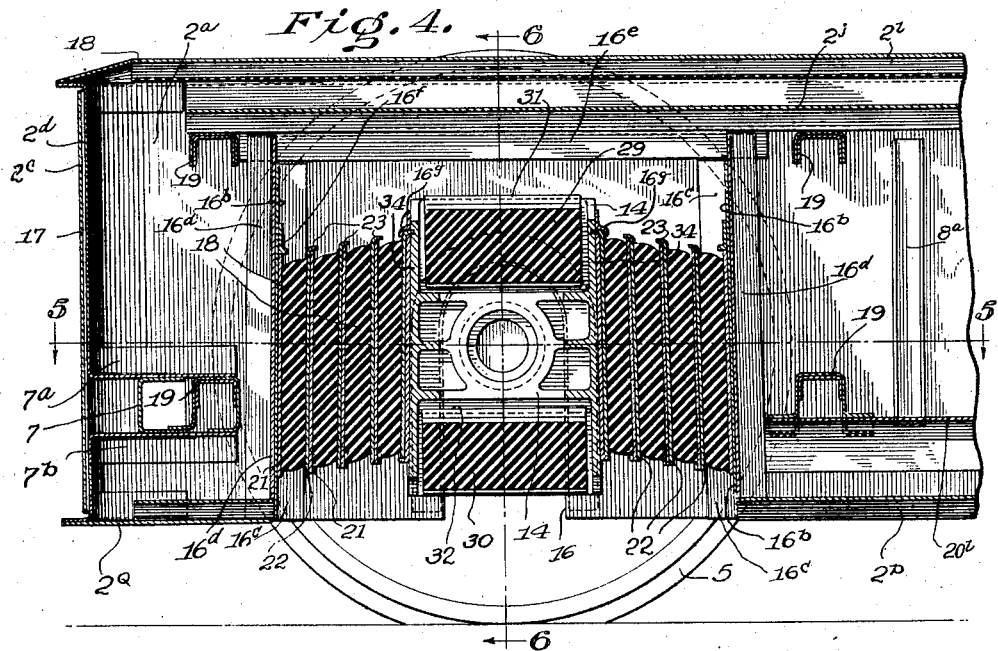
INVENTORS
Rupen Eksergian,
Reuben H. Horton,
John W. Morton and
Nils K. Skivesen
BY John P. Dunlop
ATTORNEY.

March 16, 1943.  R. EKSERGIAN ET AL  2,313,740

TRUCK CONSTRUCTION

Filed Jan. 6, 1940  6 Sheets-Sheet 4

INVENTORS
Rupen Eksergian,
Reuben H. Horton,
John W. Morton and
Nils K. Shivesen
BY John O. Parker
ATTORNEY.

March 16, 1943.　　R. EKSERGIAN ET AL　　2,313,740
TRUCK CONSTRUCTION
Filed Jan. 6, 1940　　6 Sheets-Sheet 5
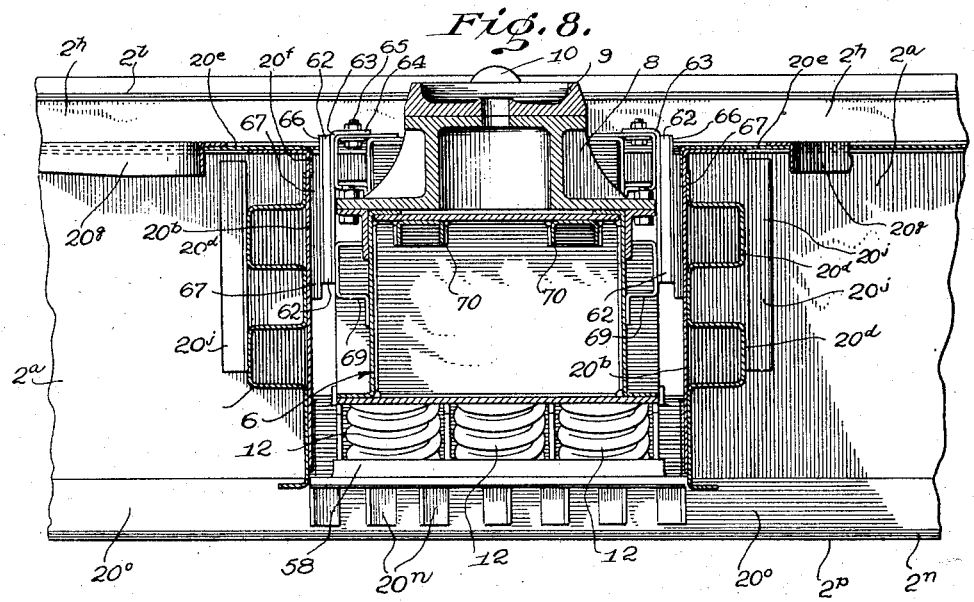
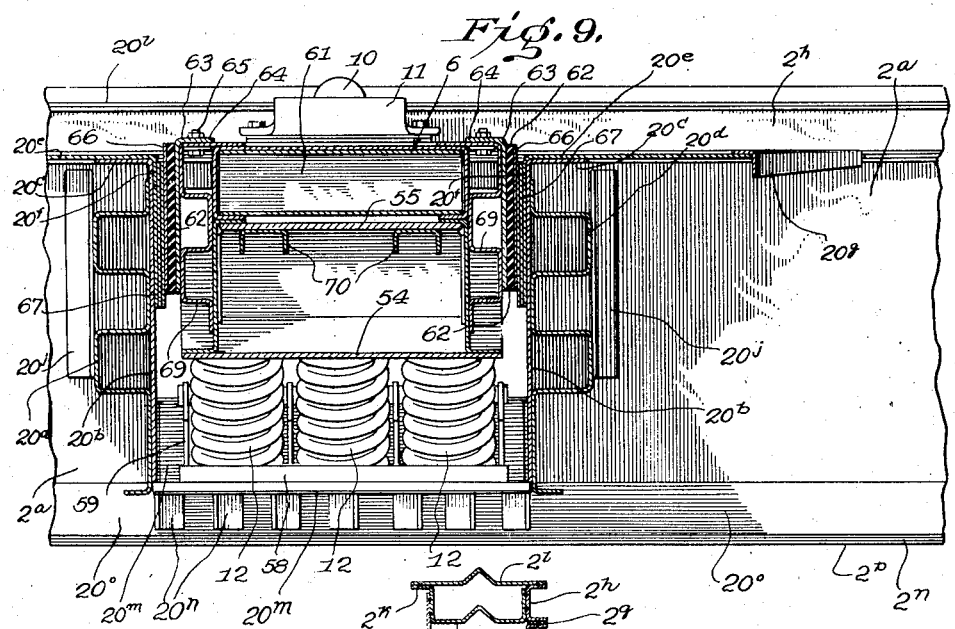
INVENTORS
Rupen Eksergian,
Reuben H. Horton,
John W. Morton and
Nils K. Skivesen
BY John P. Barbry
ATTORNEY.

March 16, 1943. R. EKSERGIAN ET AL 2,313,740
TRUCK CONSTRUCTION
Filed Jan. 6, 1940 6 Sheets-Sheet 6
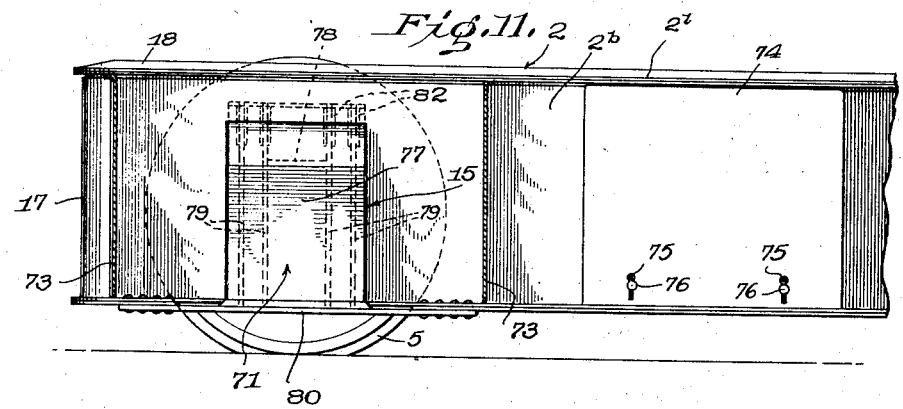
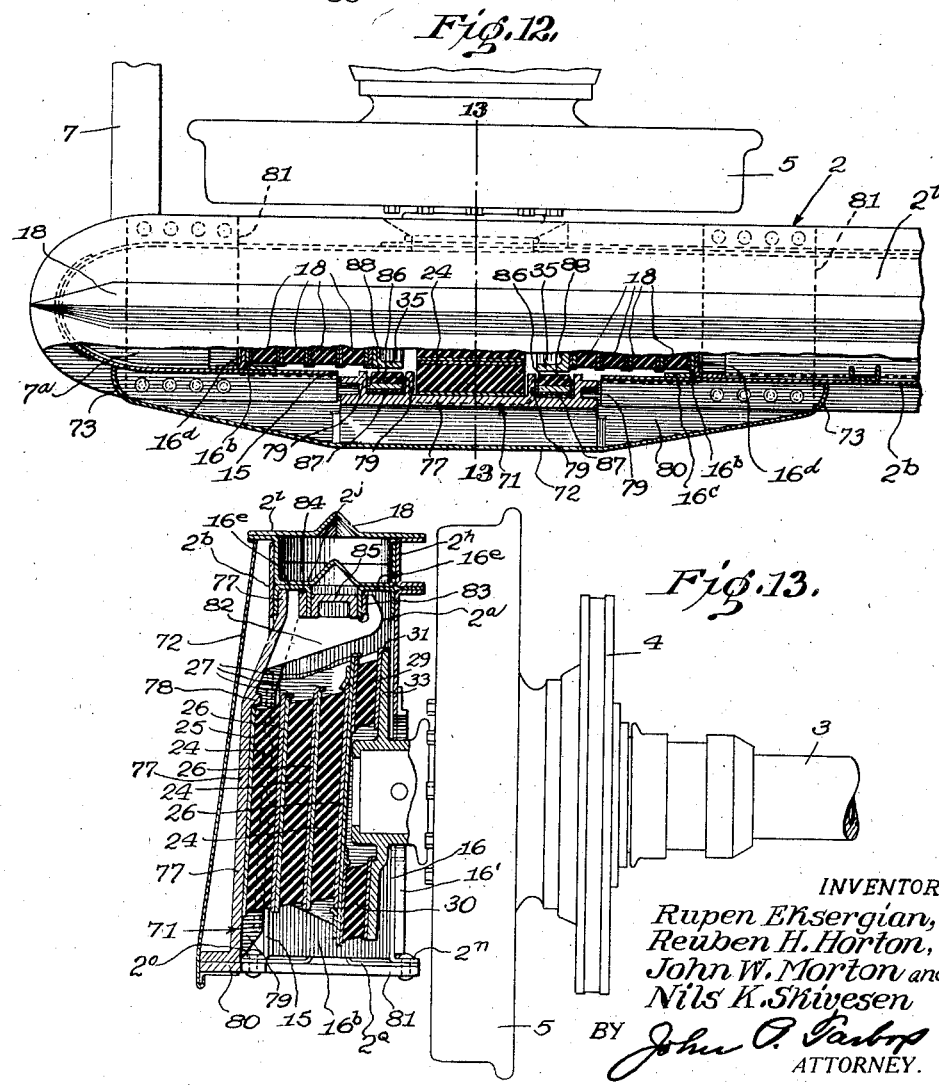
INVENTORS
Rupen Eksergian,
Reuben H. Horton,
John W. Morton and
Nils K. Shivesen
BY John O. Farley
ATTORNEY.

Patented Mar. 16, 1943

2,313,740

UNITED STATES PATENT OFFICE

2,313,740

TRUCK CONSTRUCTION

Rupen Eksergian, Media, and Reuben H. Horton, John W. Morton, and Nils K. Skivesen, Philadelphia, Pa., assignors to Edward G. Budd Manufacturing Company, Philadelphia, Pa., a corporation of Pennsylvania Application January 6, 1940, Serial No. 312,636

8 Claims. (Cl. 105—182)

The present invention relates to trucks.

More particularly, it relates to railway trucks built up of high-strength steel wherein the material mostly in the form of pressed elements, is disposed so as to attain great strength combined with minimum weight.

Another feature of the invention relates to employing rubber or the like for mounting the axles of the wheels.

A further object is to provide such truck made of high-strength steel, such as the so-called stainless steel, the whole being arranged to produce a pleasing streamlined appearance, and providing a truck which, while relatively light, is nevertheless very strong and durable, as well as quiet in operation.

Other objects and advantages of the invention will in part be pointed out in detail in the present specification and in the drawings accompanying the same, and in part will be obvious from the structures disclosed.

In said drawings:

Fig. 1 is a plan view of the truck, certain parts being broken away, and other parts being shown in section;

Fig. 2 is a side elevation thereof, with parts broken away and other parts in section;

Fig. 3 is a perspective view showing the frame of the truck, stripped of auxiliary parts, such as springs, wheels, axles, etc.;

Fig. 4 is a fragmentary sectional side elevation, showing one end of the truck, the section being made on the plane indicated by the line 4—4 of Fig. 1;

Fig. 5 is a corresponding fragmentary plan view of one corner of the truck, partly in section, on the horizontal plane indicated by the line 5—5 of Fig. 4;

Fig. 8 is a fragmentary elevation of the middle portion of the truck, partly in section on the vertical plane indicated by the line 8—8 of Fig. 1;

Fig. 9 is a similar view, but with the section made as indicated by the line 9—9 of Fig. 1;

Fig. 10 is a typical cross section through one of the side frames of the truck.

Fig. 11 is a side elevation of one end of one side frame of a somewhat modified truck, certain parts being shown in vertical section;

Fig. 12 is a fragmentary plan view thereof, showing one corner of the truck partly broken away and in horizontal section; and Fig. 13 is an elevation corresponding to Fig. 11, partly in section on the vertical plane indicated by the line 13—13 of Fig. 12, to show the journal and associated structure.

Figure 6:
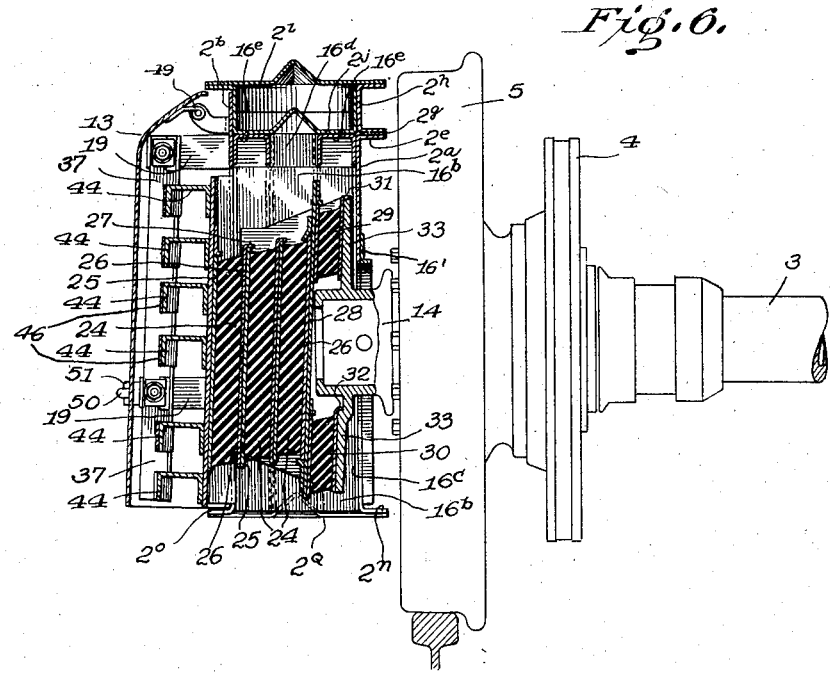
Fig. 6 is a fragmentary vertical section through one of the journals, on the plane indicated by the line 6—6 of Fig. 4.

In all the figures, similar elements are designated by the same reference characters. It will be noted that Figures 1 and 2 are on a comparatively small scale, Figure 3 and 10 on a somewhat larger scale and the remaining Figures 4 to 9 and 11 to 13 on a still larger scale.

Referring first to Fig. 1, reference character 1 denotes the transoms which extend across the truck and connect the two side frames 2, 2. At each end of the truck there is a main cross member 7, connecting the said frames. In the space between each transom 1 and the corresponding cross member 7, is located a wheel-and-axle assembly comprising an axle 3 carrying the two wheels 5, with their cooperating brake disks 4.

In the center between the transoms is located the bolster 6 carrying the supporting base 8, here shown as rectangular, with strengthening ribs extending radially thereof, and which in turn supports the cupped center plate 9, which, in conjunction with the rollers 10, one of which is disposed near each end of the bolster 6 and confined between the parallel guide plates 11, carries the weight of the vehicle. Each end of the bolster 6 is mounted on a set of springs 12, shown in Figs. 1 and 2, but best illustrated in Fig. 7.

Attention is now directed to the truck frame consisting of side frame 2 and transoms 1, as shown in Figures 1 and 3, which is built up substantially of relatively thin plates suitably secured to one another by welds, preferably spot welds, for providing a light, strong and durable truck frame.

Each side frame 2 has inner and outer side plates 2a and 2b respectively extending longitudinally thereof in spaced parallel relation to one another and having the ends thereof gradually curved toward one another and overlapped by curved end plates 2c and 2d, which are secured thereto for providing the rounded ends 17 for the frame. The inner plate 2a has the upper longitudinal edge thereof throughout the major portion of its length flanged outwardly, as at 2e and has secured between the same and the lower flange of a longitudinally extending channel member 2h spacing strips 2g and gusset members 20e which will be further described as the description proceeds.

Positioned between and attached to the channel 2h and the upper longitudinal portion of the outer side plate 2b is another channel member 2j of substantially greater width than said first-mentioned channel and provided with a central inverted V-shaped stiffening corrugation therein extending throughout its entire length. The side portion of the channel 2j attached to the side plate 2b is flanged outwardly, as at 2k, for attachment to one side edge of a main top plate 2¹, while the opposite side edge of said top plate is attached to the upper side portions of the channel 2h and outwardly formed flanges 2m on the side plate 2a at the opposite ends of the channel 2h as shown in Figure 3 of the drawings. This top plate 2¹ is also constructed with a longitudinally extending inverted shaped corrugation 18 thereon which adds to the appearance of the frame as well as serving the purpose of a stiffening means.

The outer plate 2b has a pair of rectangular portions cut out of same at 15 which extend upwardly from the bottom, one near each end thereof, and with the metal flanged at the vertical edges as shown at 15' in Figures 2, 3 and 5, while the inner plate 2a has somewhat similar cut out portions 16 opposite said first-mentioned cut outs which are provided with rounded tops and with reinforcements at their edges, as at 16', said cut out portions 16 being provided to accommodate the axles 3.

At the cut out portions 15 and 16 in each end of the side frame is provided a pedestal built up of sheet steel members welded together for efficiently supporting the resilient elements 18 that in turn are supported by the journal boxes 14. Extending between the two cut out portions 15, 16 and attached to outwardly formed flanges 2n and 2o on the lower edges of the inner and outer side plates 2a and 2b is a bottom plate 2p which also has a central longitudinally extending inverted V-shaped corrugation therein. Similar short bottom plates 2q are located in the spaces between the cut out portions 15, 16 and the extreme ends of the side plates 2a and 2b. Substantially vertical end walls 16b of each pedestal are attached to the inner and outer side plates 2a and 2b by flanges 16c formed on the edges of the walls and are inclined slightly toward one another as they extend upwardly. Backing up each wall 16b is a series of channels 16d (there being three in number) arranged side by side and welded to one another and to the end wall 16b and the side plates 2a and 2b. The innermost channels of each series 16d are of greater height than the ones on each side thereof and extend between and are attached to the opposite ends of a pair of spaced horizontal channels 16e which in turn are attached to the side plates 2a and 2b and are in facial engagement and attached to the longitudinally extending strengthening member 2j.

At a point midway of each side frame 2, the side plates 2a and 2b thereof have relatively large rectangular holes 20 and 20a therein through which the ends of transverse plates 20b of the transoms 1 extend and are attached at the vertical edges thereof spaced from one another for receiving the bolster therebetween. The plates 20b are strengthened by bending the upper portions thereof outwardly and away from one another as at 20c and are further reinforced by longitudinally extending rectangular corrugated plates 20d here shown as having substantially square corrugations, thus giving a structure of very great strength and stiffness, yet light in weight.

Large gusset plates 20e, previously referred to, attached to the plates 20b extend the entire width between the two side frames 2 and are attached thereto by being welded between the flanges 2e of the inner side plates 2a and the channels 2h. The gussets 20e overlap the flanges 20c of the plates 20b and are flanged themselves at 20f for engagement and attachment to the main body of the plates 20b. The free edges of said gusset plates extending between the side frames are generously curved and having fixed thereto similar curved angles 20g for rigidly stiffening said edges.

The transom plates 20b protrude through the openings 20a in the side plates 2b and are rigidly secured to said side plates by vertical angles 20h welded to both of said plates. Similar vertical angle members 20j form the connection between the inner side plates 2a and the transom plate 20b. However, in this case the angles are secured to the corrugated plates 20d as said corrugated plates extend through the inner side plates 2a to points adjacent the outer side plates 2b and are in turn attached to the inner faces of said outer plates by angles 20k.

The rectangular openings 20 in the inner side plates 2a are of greater depth than the openings 20a in the outer side plates 2b and an inclined longitudinally extending flange member 20¹ positioned between the inner and outer plates of each side frame and located in the lower portion thereof with a side edge thereof flush with the bottom of each opening forms an inclined bottom on which the springs 12 rest. The member 20¹ terminates short of the vertical channels 16d and the flanges thereon are welded or otherwise attached to the inner and outer side plates 2a and 2b. Also extending longitudinally of each side frame and attached by welds to the lower portion of the side plate 2a and the outwardly formed flange 2n thereon is an angle member 20° which materially stiffens said frame between the two openings 16.

Small rectangular holes are provided in the inner side plates 2a of the side frames into which the ends of the cross members 7 extend, said members 7 being in the form of channels for producing strong and light members to aid in supporting the side frames in proper spaced relation to one another. Inside of each side frame a pair of flanged plates 7a and 7b are arranged one above and the other below the end of channel spaced cross member 7 to which said member is welded; said flanges on said plates 7a and 7b are in turn welded to the side walls of the frame for rigidly connecting the end of the member 7 to the side frame. To further aid in stiffening the side plates of 2a and 2b of the side frame, vertical channel members 8a are attached thereto by welds on the inner surfaces thereof at points between the channels 16d and the transom.

From the foregoing it can be seen that relatively thin sheet steel parts are formed in such a manner and are attached together by welds to produce a railway truck frame which is extremely light in weight and which will be strong and durable in use.

Referring now to Figures 2, 4, 5 and 6, it will be noted how the journals 14 on the ends of the axles 3 are mounted upon rubber sandwiches 13 located near the ends of the side frames 2. Each journal 14 has four rubber sandwiches 13 arranged on each side thereof and each sandwich 18 consists of a central slab of rubber with a metal plate 21 on one face thereof, and a similar metal plate 22 on its opposite face, the plate 22 differing from the plate 21 in having a bent upper end, as shown at 23. This end 23 engages the top of the succeeding plate 21, as shown, so that each rubber slab in turn transmits its load to the slab next thereto.

On each end wall 16b an abutment 16f is provided which is engaged by the plate 22 of the outermost sandwich 18 while a plate 21 of the innermost sandwich is detachably fixed as at 16g to the side of the journal box 14. With each rubber sandwich connected to the sandwiches next thereto and the end sandwiches connected to the frame wall 16b and the journal box 14, it can be seen that the weight on the truck will be supported by the rubber of the sandwiches in shear.

As previously stated the reinforcements 16d are slightly inclined toward one another so as to make the opening receiving the sandwiches and journal box somewhat narrower at the top. This will result in causing the sandwiches to wedge firmly together when inserted from below.

In this way the rubber sandwiches are arranged in what may be generally designated as a series of cascade assemblage so that the yields in shear are added to one another, thus enabling the truck frame to have a greater range of vertical motion with respect to the axle than if only a single sandwich were provided. These rubber sandwiches thus perform the functions usually accomplished by springs, that is they provide a yieldable resilient connection between the journal and the truck, but are both lighter in weight and quieter in operation than such metal springs of equivalent capacity would be.

The covers 13, serve to conceal and protect these rubber elements, as well as other supporting elements, which will now be described. Referring to Fig. 6, there are shown three additional rubber sandwiches 24, each having a plain flat metal plate 25 on one face and a similar plate 26 on its other face, each plate 26 having a hooked or bent portion 27 at its upper end as indicated. The outermost plate 25 is secured to the side frame 2 and the innermost plate 26 is secured to another plate 28 which in turn bears on two additional rubber sandwiches 29 and 30 disposed respectively above and below the end of the journal of axle 3, these sandwiches 29 and 30 being supported by hooks 31 and 32 engaging the plate 33, secured to the journal bearing.

In this way all the rubber sandwiches cooperate to support the side frame 2 from said journal box 14, whereby the pedestal has a relatively great degree of vertical motion available, by stressing the rubber sandwiches in shear, and in addition has a limited but sufficient degree of horizontal motion available to it, in longitudinal as well as a lateral direction, by putting the rubber in tension or compression. While the element 33 on the journal box 14 has been referred to as a plate, it actually forms the inner wall of an open-ended box, as best shown in Fig. 5. This box has side walls 34 to which the adjacent sandwiches 15 are secured and has partial front walls 35, to which are secured the rubber slabs 36.

In order to provide a supporting connection between the rubber sandwiches 24 and the side frames 2, use is made of supports 19, best shown in Fig. 3, which extend outwardly from the side frames. A pair of angle-irons 37, which are parallel to one another and substantially vertically arranged, is located adjacent each pair of supports 19 and secured thereto on opposite sides, as shown in Fig. 2. In order to provide a secure connection, bolts 38 each having a sloping face on one side of the head as shown at 39, and cooperating washers 40 having similar sloping faces, are inserted through the angle irons and the holes 41 of the supports 19, so that by tightening the nuts 42 the angle irons 37 will be drawn towards the side frame 2 by virtue of correspondingly sloping portions 43 thereon, as shown in Fig. 5.

Each pair of parallel angle irons 37 will thus be firmly held, at the top and at a point adjacent the bottom, to one set of supports 19. The two pairs of angle irons 37 cooperating with each pedestal are connected by a plurality of channel-irons 44, shown in section in Fig. 6 and in plan in Fig. 5. These channel members 44 are slightly offset at their central portions, as best shown in Fig. 5, and at this location the plate 45 is rigidly secured thereto, to further stiffen them and to provide means for securing the outermost rubber sandwich 24 so that some of the load carried by the side frame may thus be transferred to said rubber sandwiches. To further stiffen the channels 44 metallic strips 46 are welded or otherwise fixed to the outer sides of each.

In order to provide ready access to this rubber structure, it is desirable to support the covers 13 by means of hinges 49 at their upper ends, as shown in Fig. 6, these hinges being spaced sufficiently far from the outside of the side frame to permit raising the cover 13 out of the way. To hold the cover 13 in its normal position, eyelets 50 may be carried by the lower supports 19 and passed through corresponding holes in the covers, so that said covers may be held firmly by wedges 51 forced into said eyelets, as best shown in Figs. 5, 6, and 7.

It will also be noted, from Fig. 5 in particular, that the supports 19 extend through the outer plates 2b of the side frames 2 and are firmly secured to the frames in any suitable way, as by rivets or welds, to various stiffening and spacing members for said plates for securing a very firm connection between the supports 19 and the said plates of the side frames, so that the supports 19 will be capable of adequately supporting the weight and load of the side frames.

Figure 7:
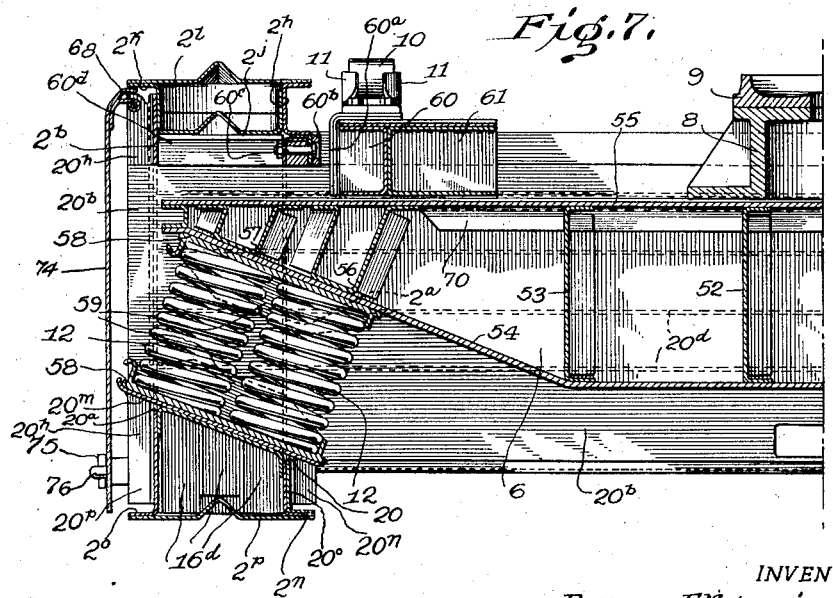
Fig. 7 is a vertical section transversely through one half of the central portion of the truck, partly in elevation, the section being made on the vertical plane indicated by the line 7—7 of Fig. 1.

Referring now to Fig. 7, there is shown one half of the bolster, together with the springs carrying its end. It will be noted that the bolster 6 likewise is made of spaced, relatively thin, plates of metal connected to one another, at suitable intervals, by intermediate members, to provide the necessary strength and rigidity. Such intermediate members are indicated, for example, at 52 and 53, where rectangular spacers having their side edges bent at right angles, are secured to the said plates forming the bolster.

At each end the bolster is preferably provided with an inclined lower wall, as shown at 54, in order to provide suitable abutments for the springs 12. This inclined end portion 54 is braced against the upper plate 55 by suitably bent braces or spacers 56 and 57, each of which is made by bending a piece of sheet material in the form shown, the said members 56 and 57 being arranged in substantial alinement with the sets of springs 12 so as to transmit the thrust thereof to the upper plate 55 of the bolster and thence to the associated rollers 10, as shown. A retaining pan 58 is disposed at each end of the respective sets of springs 12, to hold the springs against lateral displacement. Reference to Fig. 2, in connection with Fig. 7, will make these structures clear, and it will be seen that the pans 58 have ribs 59 projecting therefrom to hold the individual pairs of springs in their proper places.

The upper pans 58 are shown as engaging the inclined surfaces of the bottom walls 54 of the bolster while the lower pans 58 are disclosed as resting on the plates 20m fixed to the inclined flanged member 20¹ positioned at the lower edges of the opening 20 and 20a between the inner and outer side plates 2a and 2b of these side frames. To aid in supporting said last-mentioned pans, vertical members 20n and 20p are attached to the outer faces of the angle 20° and the side plate 2b and have their upper ends abutting and affixed to the bottom of the plate 20m.

In order to bring each roller 10 and its guides 11 to the proper elevation, these parts may be supported from the bolster by means of the formed supports 60 and 61, each made of relatively thin sheet metal, bent as indicated in Fig. 7. Secured to the supports 60 and 61 are end plates 60a adapted to engage stops 60b on the side frames 2 for limiting end movement of the bolster 6 in both directions. The stops 60b are of a yieldable nature, being in the form of rubber vulcanized to metallic plates which in turn are bolted, as at 60c, to the upper portions of the inner side plates 2a of the frames. At the point where each stop 60b is located laterally extending angles 60d back up said side plate 2a and extend to and engage the outer side plate 2b, said angles being attached by welds or the like to the under surface of the longitudinally arranged channel member 2j of the side frame. The bolster carries and has positioned between the same and the truck frame rubber sandwiches 62 shown in elevation in Fig. 8, and in vertical section in Fig. 9. Each comprises a plate 63, vulcanized to one side of the rubber slab and having a flange 64 thereon secured to the bolster by bolts 65, there being a plate 66 on the other face of the rubber, which slides on the plates 67 secured to the truck frame by riveting, welding or the like. The rubber of the sandwiches 62 thus provide a yieldable slidable connection for the bolster on the truck frame.

On the sides of the bolster adjacent the transoms are reinforcements in the form of longitudinally extending rectangularly corrugated plates 69, thus giving a structure of very great strength and stiffness, yet light in weight. It is to these members that the plates 63 of the rubber sandwiches 62 are attached. Stiffening channels 70 running longitudinally of the bolster and secured to the under-surface of its top plate are provided to strengthen the same. The ends of the bolster are covered by plates 74, which may be hinged at 68 to the reinforcing rails 20h and held in place in any suitable manner, for example, by means of cotter pins 75 passing through studs 76. By lifting the covers 74, access can be had to the bolster-supporting spring structures.

Referring now to the slightly modified form illustrated in Figs. 11, 12, and 13, it will be seen that in general the features involved in this form are similar to those already described, but by modifying the supporting means for the rubber sandwiches, a further economy of space has been secured. Namely, the channel members 44 of Fig. 6 have been eliminated and in place thereof a sufficiently strong supporting member 71 has been substituted. The rubber sandwiches 24 with their plates 25 and 26 are identical in the two forms, as are also the hooks 27 and the like for supporting the load from the pedestal through the rubber slabs. The cover plate 72 is here a much flatter member as distinguished from the more deeply bowed cover plate 13 of the other form, this flattening being made possible by the elimination of the channel members and the resulting economy of space.

As best shown in Fig. 12, this cover plate 72 consists of three substantially plane portions bent at a slight angle to one another, and with rounded end portions 73 which adjoin the side frames. These cover plates may be removably secured over the ends of pedestal structures in any desired way, so as to provide an ornamental protective covering for the rubber portions, which may be removed readily whenever necessary, to give access to said pedestals. The cover 74, which gives access to the bolster-supporting springs and the holding means therefor are substantially the same as the corresponding parts of Fig. 1.

The supporting member 71 may be a casting, forging, or a structure built up of heavy plates welded together for providing a main flat body portion 77 to be connected to the side frame and support the rubber sandwiches 24. An abutment 78 on the body portion is engaged by the plate 25 of the outermost sandwich for placing the rubber elements in shear when a load is applied on the frame of the truck. A pair of vertically extending ribs 79 are provided on the inner side of said flat body portion adjacent its opposite side edges for rendering rigidity to the body portion.

The upper end of the body portion 77 is hooked under the outermost of the channels 16e, while the lower portion of said body is flanged outwardly and has attached thereto by welding or the like a bottom plate 80 extending longitudinally of the frame to points beyond the member 71, where the lateral extensions 81 are provided which extend under the side frame and are riveted or otherwise secured to the outwardly directed flanges 2n, 2o of the inner and outer side plates 2a and 2b of the frame.

To further attach the upper portion of the body 77 to the side frame, inwardly extending spaced arms 82 are carried thereby which have abutment plates 83 and 84 thereon for engaging opposite walls of the channels 16e, while a spacing element 85 is inserted between the two channels 16e. With this arrangement it can be seen that the outward force of the rubber sandwiches 24 will apply an even pressure on the different faces of the channels 16e thus relieving any particular one of the entire outward force.

Supported on the body portion 77 between the ribs 79 of each pair are yieldable stops 86 consisting of metal plates 87 and rubber slabs 88, which are adapted to be engaged by the partial front walls 35 of the journal box structure 14 for limiting endwise movement of the axle 3 on the frame of the truck.

The operation of the trucks herein described will be clearly understood from the description of their structures and the invention may be summarized briefly as consisting in providing a relatively light and strong framework, built up mainly of flat sheet metal, pressed or drawn into suitable structural shapes, wherein the load is transmitted from the wheels to the bolster largely through rubber slabs mounted in shear, thus providing sufficient strength and resiliency, combined with relative lightness and a pleasing streamlined appearance. The rubber substituted for the customary steel springs provides greater smoothness and quietness in operation.

It will be clear that many changes may be made in various details of the trucks without losing the advantages of the invention, and that many modifications may be made in the appearance of the truck without in any way changing the mechanical features or the operation of the same. The invention is therefore understood to be defined by the following claims.

We claim:

1. A wheel truck having sheet metal side frames, a sheet metal transom connecting the same, and a sheet metal bolster housed within said transom, each of said side frames comprising two generally vertical side walls which are transversely spaced from each other, said walls being provided with registering openings in the region of the transom, at least some of the walls of the transom extending through said openings and being connected to both walls of each side frame, said bolster having its bottom sloping upward near each end, to provide an inclined lower surface thereat, and resilient means bearing against said inclined surfaces and against the frames substantially in the interior of the latter, to support said bolster.

2. A wheel truck consisting of hollow side frames built up of sheet metal, said frames being connected by a transom likewise built up of sheet metal, each side frame comprising transversely spaced substantially vertically arranged walls, said spaced walls having a substantially vertical slot adjacent each end and journal boxes located in said slots, members being connected to said walls of the side frames along the margins of said openings so as to form a housing for said boxes, rubber springs stressed in shear being inserted between said members and said boxes.

3. A wheel truck consisting of side frames connected by a transom, each side frame having a vertical outer wall or web and a pedestal-forming opening at each end, means comprising rubber elements for supporting the frame from the journal box, said means being arranged substantially on the inner side of the planes defined by said outer walls, and a cover mounted near each end of each frame on the outer side thereof, to conceal and protect the said elements.

4. A wheel suspension for a vehicle such as a truck, comprising a frame and a journal box, resilient means such as rubber sandwiches being located in transverse direction of the truck outside the end of the journal box.

5. A hollow side frame of sheet metal construction for a truck, comprising spaced inner and outer side plates, spacing members associated with said side plates and attached thereto, outwardly directed flanges on said side plates and on certain of said spacing members, and top and bottom closure plates in facial engagement with said outwardly directed flanges and rigidly secured thereto to form the side frame.

6. A hollow side frame of sheet metal construction for a truck comprising inner and outer side plates provided with pedestal and transom openings therein, a longitudinally extending supporting member attached to and located between the side plates for forming a continuous support for the frame above said transom and pedestal openings, outwardly directed longitudinal flanges formed on said side plates, and top and bottom cover plates attached to said flanges to form the said frame.

7. A truck frame consisting of side frames and a transom all constructed of sheet material and said transom supporting said side frames in proper spaced relation, each side frame comprising an inner and outer side plate, spacing members associated with said side plates and attached thereto, outwardly directed flanges on said side plates and on certain of said spacing members, top and bottom cover plates attached to said flanges to form said frame, and gusset members attached to said transom and extending between and attached to flanges on said inner side plate and on a spacing member.

8. A truck frame consisting of hollow sheet metal constructed side frames connected by spaced transoms likewise made of sheet metal, each side frame having an opening in both its inner and outer side walls through which said transoms extend, and vertically extending angled members attached to said side walls of the side frames and to said transoms.

RUPEN EKSERGIAN.
REUBEN H. HORTON.
NILS K. SKIVESEN.
JOHN W. MORTON.